United States Patent [19]

Becker

[11] Patent Number: 4,684,165

[45] Date of Patent: Aug. 4, 1987

[54] MOTOR VEHICLE SUN SCREEN APPARATUS

[76] Inventor: Charles E. Becker, 5796 Ulmerton Rd. #405, Clearwater, Fla. 33520

[21] Appl. No.: 941,910

[22] Filed: Dec. 15, 1986

[51] Int. Cl.⁴ ............................................. B60J 7/20
[52] U.S. Cl. ...................................... 296/136; 135/88
[58] Field of Search ................. 296/136; 135/88, 102; 150/52 K

[56] References Cited

U.S. PATENT DOCUMENTS

| | | | |
|---|---|---|---|
| 2,696,825 | 12/1954 | Lamb | 135/88 |
| 3,316,012 | 4/1967 | Thier | 296/136 |
| 3,992,053 | 11/1976 | Hrytzak et al. | 135/88 |
| 4,164,233 | 8/1979 | McAndrew | 296/136 |
| 4,432,581 | 2/1984 | Guma | 296/136 |

Primary Examiner—Robert R. Song
Attorney, Agent, or Firm—Herbert W. Larson; Joseph C. Mason, Jr.

[57] ABSTRACT

A cover is draped over a roof rack frame, a front frame and rear frame. Each frame has depending legs terminating in a suction cup that is attached to a surface of a motor vehicle. The edges of the cover have reinforced holes. At least two tie-down members are attached at one end to the holes on each front and rear edge of the cover. The lower edge of the vehicle engages the other end of each tie-down member.

7 Claims, 9 Drawing Figures

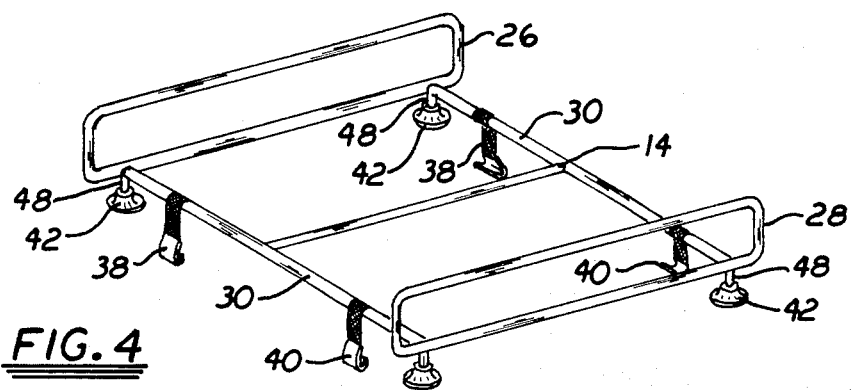
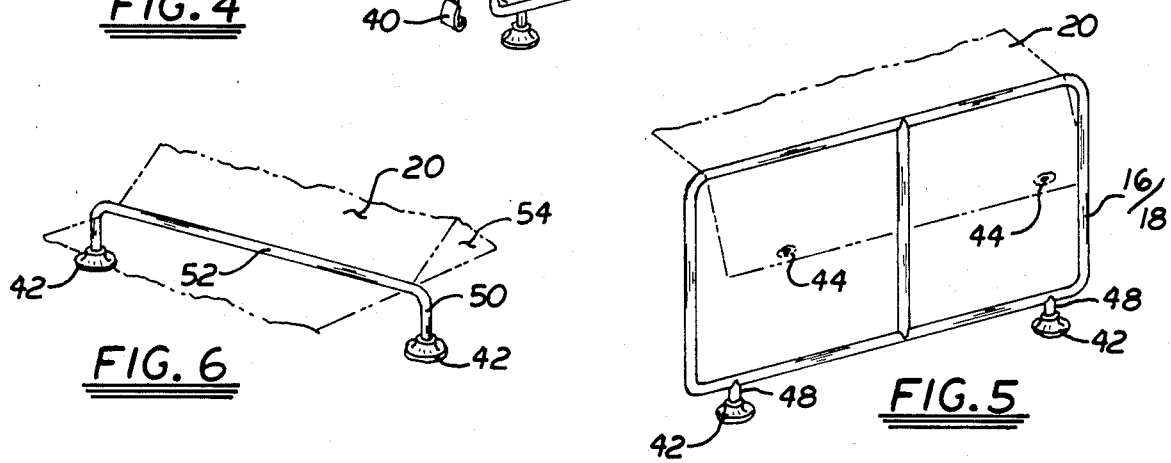
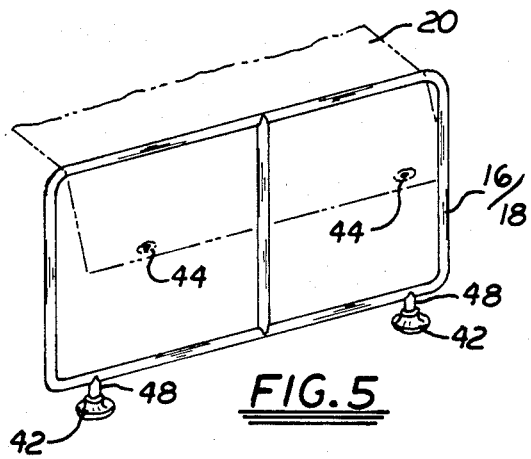
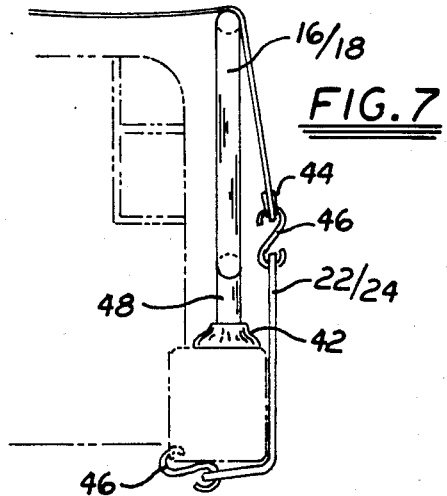
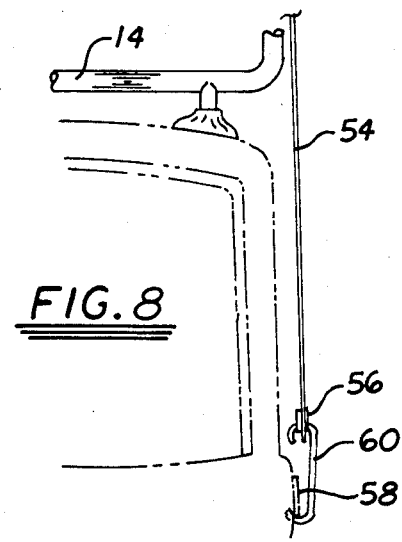
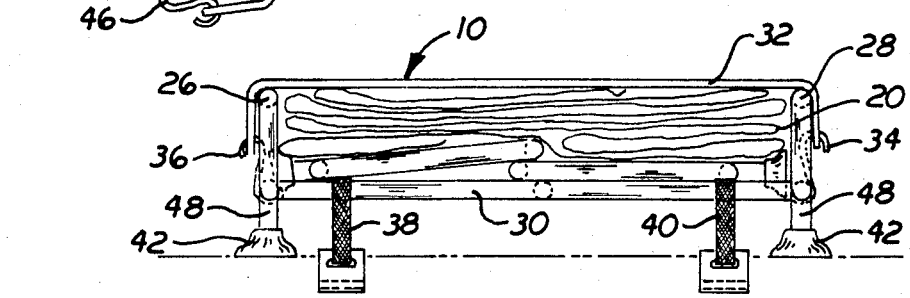

MOTOR VEHICLE SUN SCREEN APPARATUS

BACKGROUND OF THE INVENTION

1. Field of the Invention.

This invention relates to sun screen devices for motor vehicles. More particularly, it refers to a sun screen covering the entirety of a vehicle, but substantially spaced apart from the vehicle to permit flow of air between the screen and the vehicle.

2. Description of the Prior Art.

Sun screens are used on motor vehicles for multiple purposes. One such purpose is to slow down deterioration of paint surfaces. Another purpose is to minimize heating of an unoccupied vehicle exposed to the sun. Previous patents which describe vehicle covers for these purposes are:

U.S. Pat. Nos. 2,571,362, 2,798,501, 2,858,837, 3,036,583, 3,785,697 and 4,519,644.

These references describe cumbersome covers and frames not easily stored on a vehicle or a cover that cannot be spaced apart from a vehicle to allow cooling by wind currents. Furthermore, the prior art frame supported covers cannot be quickly and easily mounted. A vehicle cover is needed that rests on easily storable frame members, is easily mounted, and is spaced apart from the vehicle to permit cooling air to flow freely between the cover and the vehicle.

SUMMARY OF THE INVENTION

I have invented a frame mounted cover which solves the problems of the prior art. My cover and frame are easily stored or mounted on the top of a vehicle and the frame members space the cover a sufficient distance from the vehicle to permit adequate cooling air flow.

My cover is foldable for storage along with frame members on a roof rack frame mounted with suction cups. In a deployed condition my apparatus has a front frame mounted on the front bumper of the vehicle with suction cups and a rear frame mounted on the rear bumper in like manner. The cover is deployed over the roof rack and front and rear frame. Reinforced holes along the edge of the cover have one end of an elastic tie-down member engaged therein. The other end of each tie-down member is engaged to a lower edge of the vehicle.

BRIEF DESCRIPTION OF THE DRAWINGS

The present invention may be best understood by those having ordinary skill in the art by reference to the following detailed description when considered in conjunction with the accompanying drawings in which:

FIG. 4 is a perspective view of the roof rack support member.

FIG. 5 is a perspective view of a stand-off support member.

FIG. 6 is a perspective view of a hold down member.

FIG. 7 is a side view in elevation of the stand-off member of FIG. 5 attached to a tie-down.

FIG. 8 is a front view in elevation of a side flap with a tie-down clip.

FIG. 9 is a side view in elevation of the roof rack of FIG. 4 packaged for travel with the cover and support members.

DETAILED DESCRIPTION OF THE INVENTION

Figure 1:
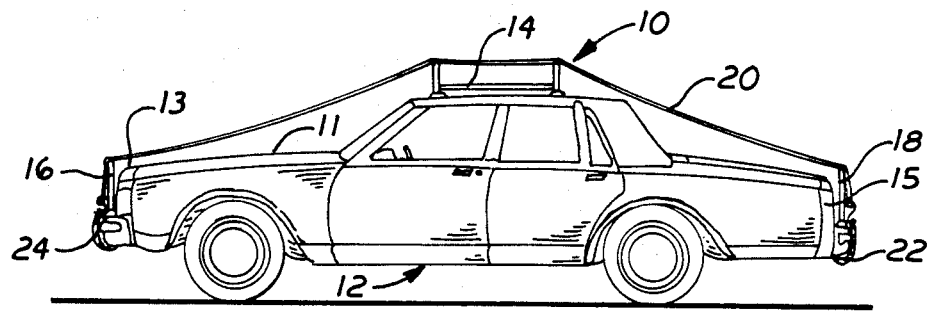
FIG. 1 is a side elevation view of a vehicle with cover mounted on a frame in accordance with the invention.

Throughout the following detailed description the same reference numerals refer to the same elements in all figures.

The sun screen apparatus 10 is shown in FIG. 1. Cover 20 covers the entire top surface 11 of the vehicle 12 and slightly overlaps the front 13 and rear 15 ends.

Figure 2:
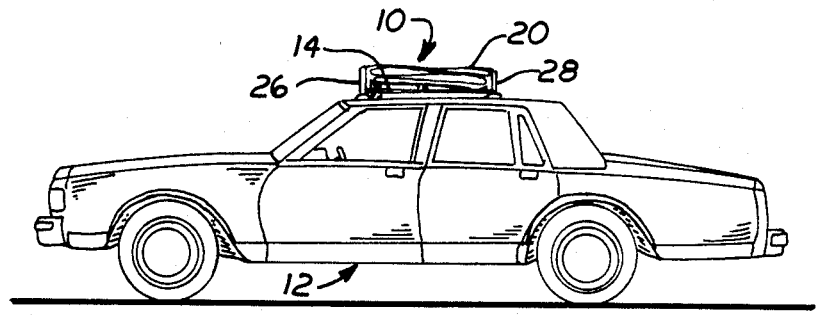
FIG. 2 is a side elevation view of a vehicle with cover and frame in a stored condition.
Figure 3:
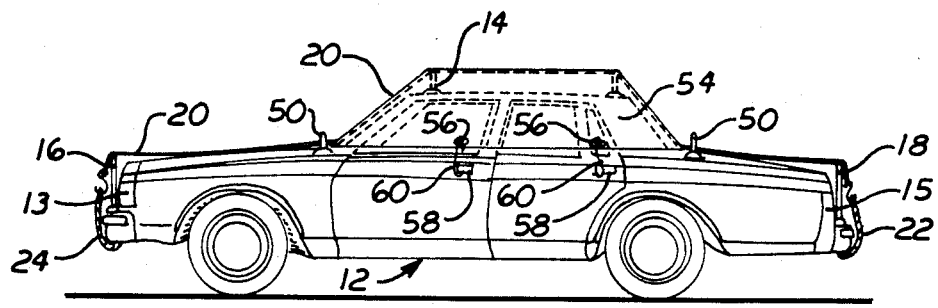
FIG. 3 is a side elevation view of a vehicle with an alternate side flap attached to the cover.

A roof rack frame 14 has a dual purpose. First, as shown in FIG. 1, the rack 14 supports cover 20. Secondly, as shown in FIG. 2, rack 14 provides a storage area for the cover 20 and a front elevated tubular frame 16 and a rear elevated tubular frame 18 together with hold down straps 22 and 24. The storage rack 14 is seen in greater detail in FIGS. 4 and 9 wherein elevated support member 26 and 28 along with base frame 30 support the entire apparatus 10. A storage flap or rain cover 32 keeps cover 20 from blowing out of the rack 14. This rain cover is held down by hold down straps 34 and 36. Safety straps 38 and 40 attached to each side of the vehicle provide a safety hold down for rack 14.

Rack 14 is held in place on top of the vehicle by suction cups 42 which receive legs 48. The rack 14 alternatively can be permanently mounted as in the manner of a typical vehicle roof rack with permanent fasteners.

Front elevated tubular frame member 16 and rear elevated tubular frame member 18 have suction cups 42 mounted on the front and rear bumpers of the vehicle respectively.

As shown in FIG. 5, the cover 20 overlaps the frame member 16 or 18 and each reinforced hole 44 at the rear or front edge of the cover 20 is used to engage the top of hold down straps 22 and 24 respectively. The bottom portion of the hold down strap 22 or 24 is fitted under the bumper, as seen in FIG. 7. An S-hook 46 is used to connect hole 44 with the hold down strap 22 or 24. Each of the frame members has legs 48 fitting into the top of the suction cups 42.

It is preferred that the frame members 16 or 18 be of a height slightly higher than the front end and rear end respectively of the vehicle and that they be slightly wider than the width of the vehicle.

It is preferred that the tie-down members 22 and 24 be placed so that at least two is engaged along each edge of the cover on the rear and front, respectively, of the vehicle.

In an alternative embodiment, tubular members 50 are mounted on the front of the vehicle adjacent to the bottom of the windshield and adjacent to the bottom of the rear window. The cover 20 is fed under frame top 52 of member 50 so that a side panel 54 integral with the top 20 can be draped over the side windows of the vehicle. Holes 56 adjacent the edge of the cover panel 54 can be engaged by one end of hold down straps 60. The other end of each hold down strap 60 is attached to door latch 58 on the vehicle 12.

The elevated frame members can be made from stainless steel, rust resistant coated metals, or aluminum alloy. The elevated frame members also can be made from a high strength plastic material.

The cover can be made from canvas, nylon, Kevlar ® or any other strong synthetic material customarily made into covers. The hold down straps are made of elastomer covered by an elastic cloth member.

The suction cups can be made of any rubber product or neoprene, which is suitable for formation of a suction on a metal surface.

Equivalent components can be substituted for the cover and support members employed with the present invention without departing from its scope.

Having thus described the invention what is claimed and desired to be secured by Letters Patent is:

1. A portable sun screen cover apparatus for an automotive vehicle body capable of being stored on a roof rack comprising in deployed sun screening mode:
   (a) a cover of sufficient length and width with front, rear and side edges to overlay a top surface of the vehicle and having a plurality of reinforced spaced holes adjacent the edges;
   (b) the roof rack having a base tubular component connected to front and rear elevated tubular frame components integral with a pair of front and rear legs, each leg ending in a means for attachment to a roof surface of the vehicle;
   (c) a front elevated tubular frame member having a heighth and width slightly greater than a front of the vehicle, the front frame member having a pair of integral depending legs each terminating in a suction cup attached to a top surface of a front bumper of the vehicle;
   (d) a rear elevated tubular frame member having a heighth and width slightly greater than a rear of the vehicle, the rear frame member having a pair of integral depending legs each terminating in a suction cup attached to a top surface of a rear bumper of the vehicle;
   (e) the cover draped to overlay the roof rack frame components, the front frame member and the rear frame member, and
   (f) elastic tie-down members engaged to two or more of the holes on each front and rear edge of the cover and elastically stretched to engage a lower edge of the vehicle.

2. A portable sun screen cover apparatus according to claim 1 wherein a first inverted U-shaped hold down tubular frame having suction cups depending from each end is attached to a top surface of an engine hood on the vehicle and a second inverted U-shaped hold down tubular frame having suction cups depending from each end is attached to a top surface of a truck lid on the vehicle and the cover is draped under the hold down frames, the cover having a lateral flap integral with each side edge which drapes over side windows of the vehicle, the side flaps having multiple reinforced holes along an edge farthest from the cover, at least two elastic tie-down members engaged at one end to the holes on each edge of the flap and at the other end to a door handle.

3. A portable sun screen cover apparatus according to claim 1 wherein in the stored mode multiple elastic straps are engaged to the base tubular component of the roof rack at one end and engaged to reinforced holes in a storage flap overlapping the cover and frame members stored in the roof rack.

4. A portable sun screen cover apparatus according to claim 1 wherein the frame members are made from tubular aluminum.

5. A portable sun screen cover apparatus according to claim 1 wherein the frame members are made from molded high strength plastic.

6. A portable sun screen cover apparatus according to claim 1 wherein the means for attachment of the roof rack to the roof surface of the vehicle is suction cups.

7. A portable sun screen cover apparatus according to claim 1 wherein the means for attachment of the roof rack to the roof surface of the vehicle is by permanent fasteners.

* * * * *